United States Patent [19]

Wada

[11] Patent Number: 5,959,639
[45] Date of Patent: *Sep. 28, 1999

[54] COMPUTER GRAPHICS APPARATUS UTILIZING CACHE MEMORY

[75] Inventor: Tomohisa Wada, Tokyo, Japan

[73] Assignee: Mitsubishi Denki Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/695,880

[22] Filed: Aug. 12, 1996

[51] Int. Cl.$^6$ .................................................. G06F 15/167
[52] U.S. Cl. .......................... 345/512; 345/520; 345/502; 345/513
[58] Field of Search ........................... 345/501, 507–509, 345/512, 520, 502, 448, 449, 421, 422; 711/118–120, 121, 122; 395/280, 308, 306

[56] References Cited

U.S. PATENT DOCUMENTS

| | | | |
|---|---|---|---|
| 5,276,851 | 1/1994 | Thacker et al. | 711/120 |
| 5,450,542 | 9/1995 | Lehman et al. | 345/512 |
| 5,471,579 | 11/1995 | Kimura et al. | 345/505 |
| 5,543,824 | 8/1996 | Priem et al. | 345/508 |
| 5,559,952 | 9/1996 | Fujimoto | 345/511 |
| 5,598,517 | 1/1997 | Watkins | 345/501 |
| 5,678,009 | 10/1997 | Bains et al. | 395/305 |
| 5,678,020 | 10/1997 | Singh et al. | 711/119 |
| 5,687,357 | 11/1997 | Priem | 345/501 |

FOREIGN PATENT DOCUMENTS

| | | | |
|---|---|---|---|
| 0 624 845 | 11/1994 | European Pat. Off. | G06F 12/08 |
| 7-141500 | 6/1995 | Japan . | |

OTHER PUBLICATIONS

"Computer Graphics: Principles and Practice", by James D. Foley et al, Addison–Wesley Publishing Company, pp. 166–167 and 170–171.

*Primary Examiner*—Kee M. Tung
*Attorney, Agent, or Firm*—McDermott, Will & Emery

[57] ABSTRACT

In a computer graphics apparatus, a main memory stores image data representing pixels on a raster scan display. A cache memory is provided for retaining a partial copy of the image data in the main memory. A computing unit processes the image data copied into the cache memory. A video cache memory acquires image data from the main memory and the cache memory. A graphics controller acquires image data from the video cache memory and outputs the image data to the raster scan display.

14 Claims, 14 Drawing Sheets

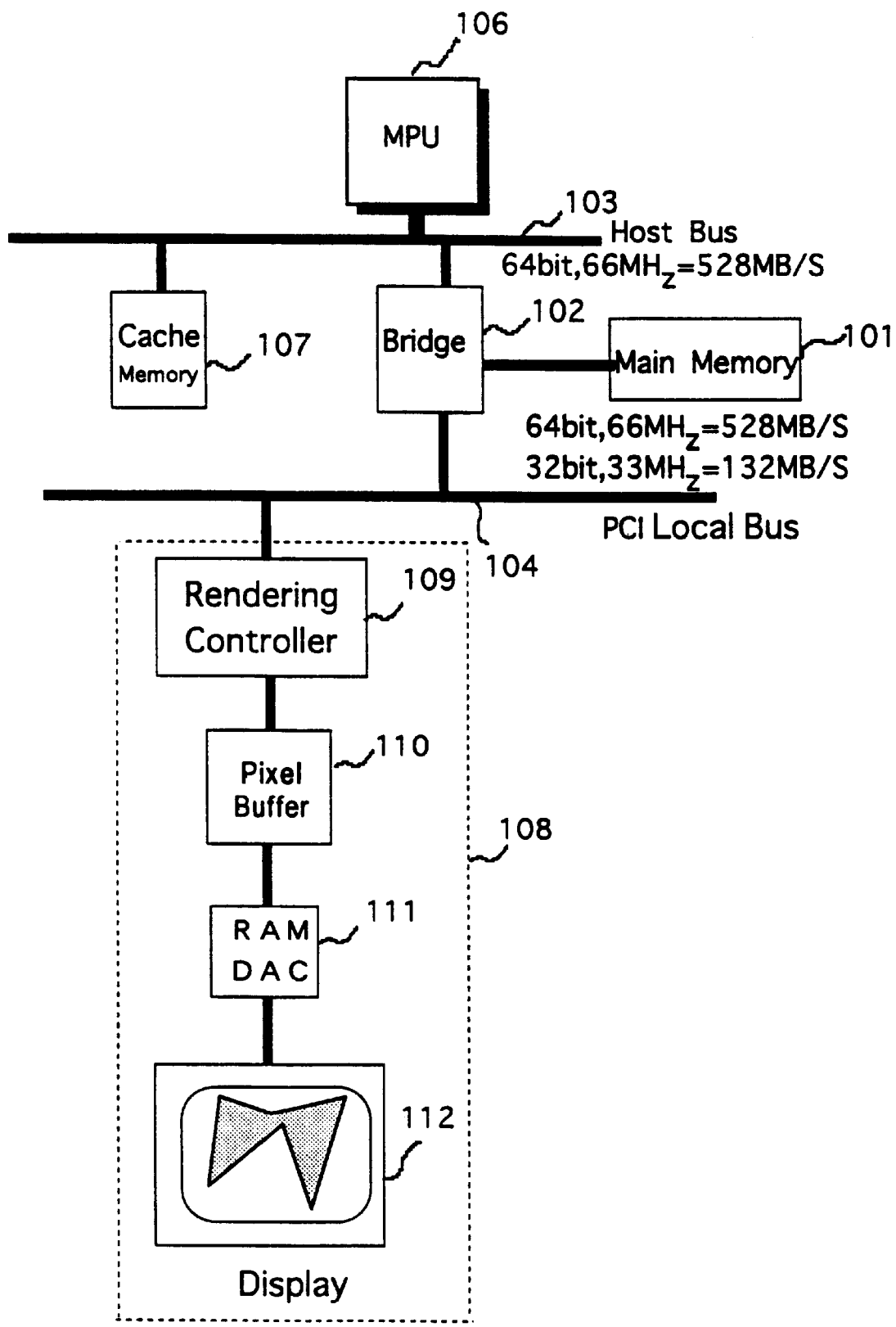

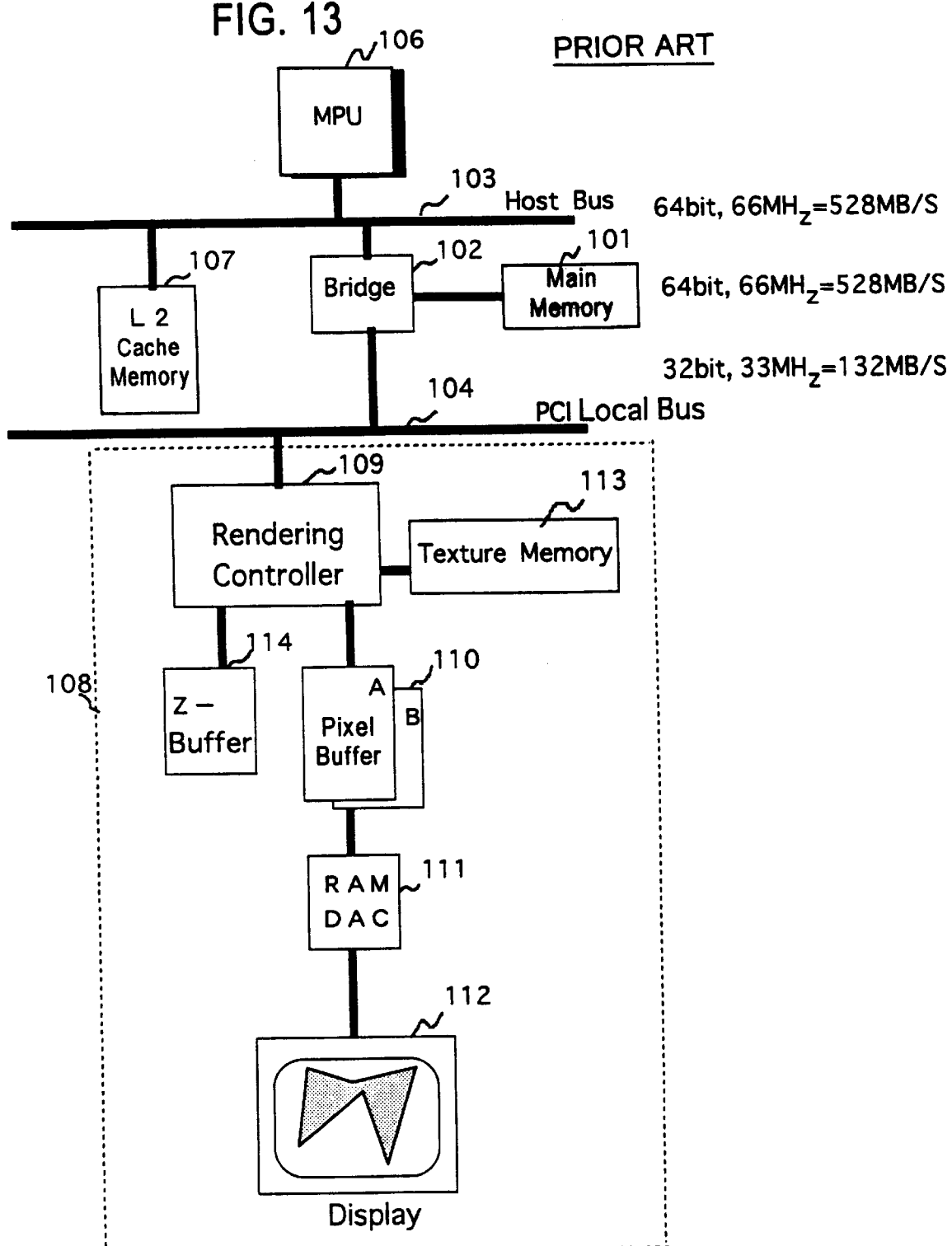

COMPUTER GRAPHICS APPARATUS UTILIZING CACHE MEMORY

TECHNICAL FIELD

The present invention relates to a computer graphics apparatus for carrying out computer-aided digital image processing and displaying the result of the processing on a raster scan display. More particularly, the invention relates to a computer graphics apparatus that may be applied in personal computers and workstations utilizing microprocessing units (MPU).

BACKGROUND ART

FIG. 12 is a block diagram of a conventional computer graphics apparatus. The apparatus comprises a main memory 101, a bridge 102, a host bus 103, a local bus 104, a microprocessing unit (abbreviated to the MPU hereafter) 106, a cache memory 107 and a graphics subsystem 108. The graphics subsystem 108 includes a rendering controller 109, a pixel buffer 110, a RAMDAC 111 and a raster scan display 112.

The bridge 102 permits data transmission among the main memory 101, host bus 103 and local bus 104. The MPU 106 controls the apparatus as a whole using programs stored in the main memory 101. The cache memory 107, typically composed of a static random access memory, retains partial copies of the programs and data stored in the main memory 101. The MPU 101 generally incorporates a cache memory as well. The incorporated cache memory is called a level 1 cache memory, as opposed to the external cache memory 107 which is called a level 2 cache memory.

The main memory 101 stores data and the programs executed by the MPU 106. The host bus 103 is used to effect data transmission between the MPU 106 and the external cache memory 107. The local bus 104, generally acting independently of the host bus 103, is used for multiple purposes such as connection with LAN (local area network) functions as well as with graphics functions. The local bus 104 may accommodate a large number of connectors for connection with various functional devices. With many functional devices connected to it, the local bus 104 operates at a frequency lower than that of the host bus 103.

The graphics subsystem 108 is connected to the local bus 104 and constituted as follows. The rendering controller 109 primarily controls the pixel buffer 110, and processes data in the pixel buffer 110 in accordance with instructions from the MPU 106. The pixel buffer 110 retains the image data to be displayed on the display 112 in the form of bit data (i.e., digital data) representing the display pixels involved. The RAMDAC 111 converts to analog values (usually voltages) the bit data (digital data) corresponding to the display pixels read from the pixel buffer 110 in keeping with the raster scan on the display 112 to drive it. The raster scan display 112 displays the image data held in the pixel buffer 110 as the bit data.

In the most typical configuration of personal computers marketed in 1995, the MPU 106 is a Pentium™ processor from Intel, the host bus 103 is 64 bits wide and operative at 66 MHz, and the local bus 104 is 13 bits wide and operative at 33 MHz.

FIG. 13 is a block diagram of another conventional computer graphics apparatus similar to that of FIG. 12. What characterizes the computer graphics apparatus of FIG. 13 is its constitution specialized to generate three-dimensional images. The setup of FIG. 13 supplements the constitution of FIG. 12 with a texture memory 113 and a Z-buffer 114. The pixel buffer 110, like its counterpart in FIG. 12, holds the image to be displayed on the raster scan display 112 in the form of digital (bit) data. The texture memory 113 is used when a graphic form having a texture is to be rendered; the memory retains data representing the texture of the graphic form surface. The Z-buffer 114 is specific to the process of generating three-dimensional images. This is a buffer that holds the vertical depth (i.e., distance) from the display surface of the bit data representing the pixels (in terms of color intensities) in the pixel buffer 110. The Z-buffer 114 is needed to determine whether any point in the three-dimensional space is to be either hidden by something else and not displayed, or not hidden and displayed (the process is known as hidden-surface removal). Detailed Z-buffer algorithms are discussed illustratively by Foley, van Dam, Feiner and Hughes in "Computer Graphics: Principles and Practice" (published by Addison-Wesley).

Constituted as outlined, the conventional computer graphics apparatus typically requires the pixel buffer memory 110, texture memory 113 and Z-buffer memory 114 in addition to the main memory 101. The resulting increase in total memory usage entails higher cost. Furthermore, the MPU 106 conventionally needs to be supplemented by the rendering controller 109 that processes the content of the pixel buffer 110. With more logic functions such as arithmetic circuits additionally included, the system tends to comprise more logic chips of higher capacities leading to a further cost increase.

DISCLOSURE OF THE INVENTION

It is therefore an object of the present invention to overcome the above-described drawbacks and disadvantages and to provide a computer graphic apparatus wherein the main memory includes areas for mapping such data as color intensities of pixels, the mapped data being copied to a cache memory for processing by an MPU. There is no need additionally to incorporate a specialized pixel buffer for accommodating such data as the pixel color intensities.

According to one aspect of the present invention, a computer graphics apparatus comprises a main memory for storing image data representing pixels on a raster scan display. A cache memory retains a partial copy of the image data in the main memory. A computing unit processes the image data copied into said cache memory. A graphics controller acquires image data by communicating with the main memory and with the cache memory, and the graphics controller further outputs the image data thus acquired to the raster scan display.

In another aspect of the present invention, the computer graphics apparatus further comprises a host bus for communication between the main memory and the computing unit, and the host bus further provides communication between the cache memory and the graphics controller.

In another aspect of the present invention, the computer graphics apparatus further comprises a host bus for communication between the main memory and the computing unit. A data transmission bus acts independently of the host bus for data transmission between the cache memory and the graphics controller.

According to another aspect of the present invention, a computer graphics apparatus comprises a main memory for storing image data representing pixels on a raster scan display. A cache memory having a video cache area retains a partial copy of the image data in the main memory. A computing unit performs image processing of the data copied into the video cache area of the cache memory. A graphics controller acquires image data by communicating with the main memory and the cache memory, and the graphics controller further outputs the image data thus acquired to the raster scan display.

In another aspect of the present invention, the computer graphics apparatus further comprises a host bus for communication between the main memory and the computing unit, and the host bus further provides communication between the cache memory and the graphics controller.

In another aspect of the present invention, the computer graphics apparatus further comprises a host bus for communication between the main memory and the computing unit. A data transmission bus acts independently of the host bus for data transmission between the cache memory and the graphics controller.

According to another aspect of the present invention, a computer graphics apparatus comprises a main memory for storing image data representing pixels on a raster scan display. A cache memory retains a partial copy of the image data in the main memory. A computing unit performs image processing of the image data copied into the cache memory. A video cache memory acquires image data by communicating with the main memory and the cache memory. A graphics controller acquires image data by communicating with the video cache memory, and the graphics controller further outputs the image data thus acquired to the raster scan display.

In another aspect of the present invention, the computer graphics apparatus further comprises a host bus for communication between the main memory and the computing unit, and the host bus further provides communication between the cache memory and the graphics controller.

In another aspect of the present invention, in the computer graphics apparatus, part of the image data to be accessed by the raster scan display is prefetched into the video cache memory prior to the access.

In another aspect of the present invention, in the computer graphics apparatus, the video cache memory includes a pixel memory area for retaining a copy of image data and a tag memory area for accommodating the position of the image data on the raster scan display. The graphics controller predicts part of the image data required next on the basis of the content of the tag memory area and of the scanned position on the raster scan display.

In another aspect of the present invention, in the computer graphics apparatus, the video cache memory includes a pixel memory area for retaining a copy of image data, and the graphics controller has a tag memory area for accommodating the position of the image data on the raster scan display. The graphics controller predicts part of the image data required next on the basis of the content of the tag memory area and of the scanned position on the raster scan display.

In another aspect of the present invention, in the computer graphics apparatus, the main memory has a frame area for a plurality of frames, and the frame area stores image data for display on the raster scan display.

Other features and advantages of the present invention will become more apparent from the following description taken together with the accompanying drawings.

BRIEF DESCRIPTION OF DRAWINGS

FIG. 12 is a block diagram of a conventional computer graphics apparatus;

FIG. 13 is a block diagram of another conventional computer graphics apparatus.

BEAT MODE FOR CARRYING OUT THE INVENTION

Figure 1:
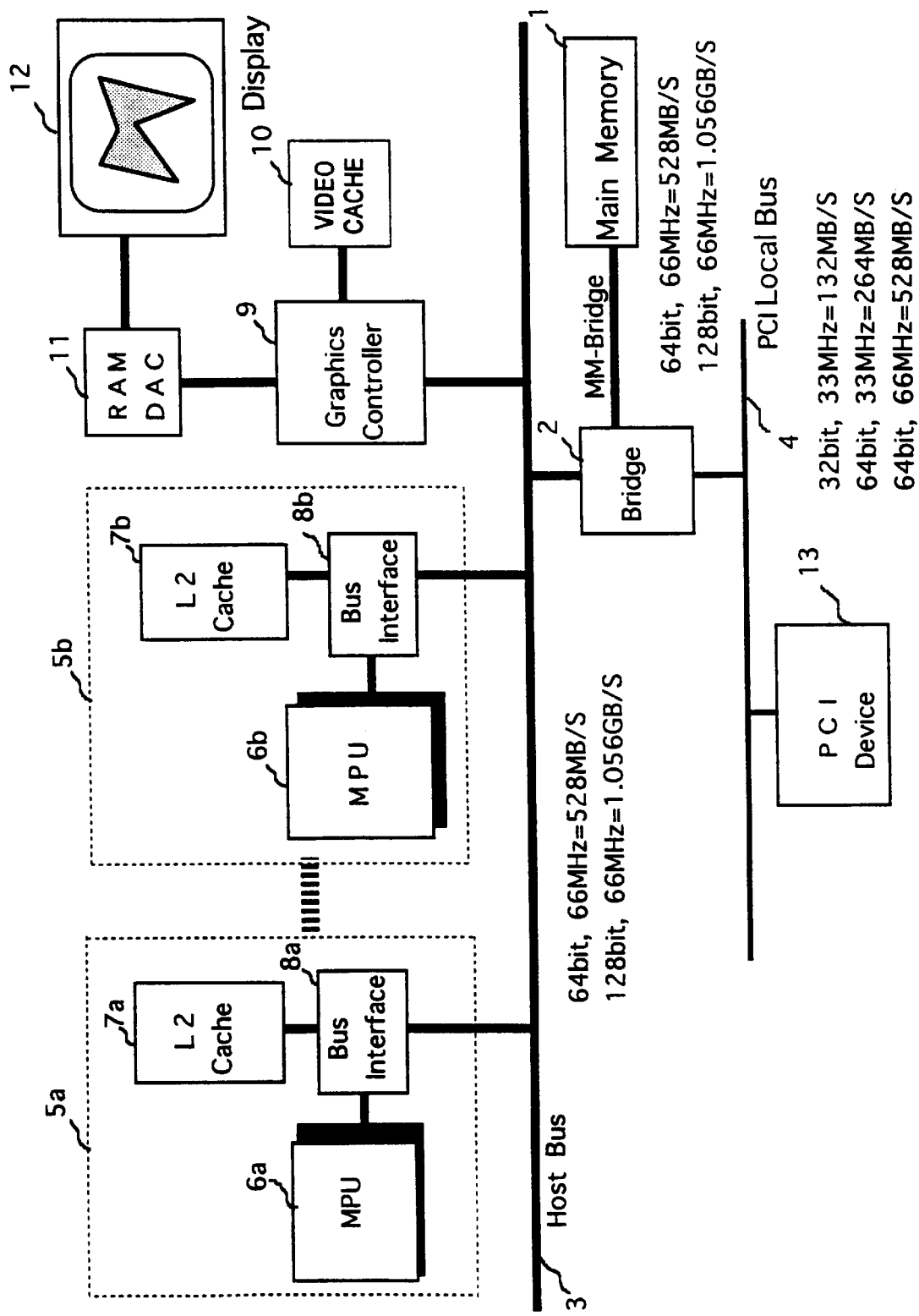
FIG. 1 is a block diagram of a computer graphics apparatus according to a first embodiment of the present invention.
Figure 2:
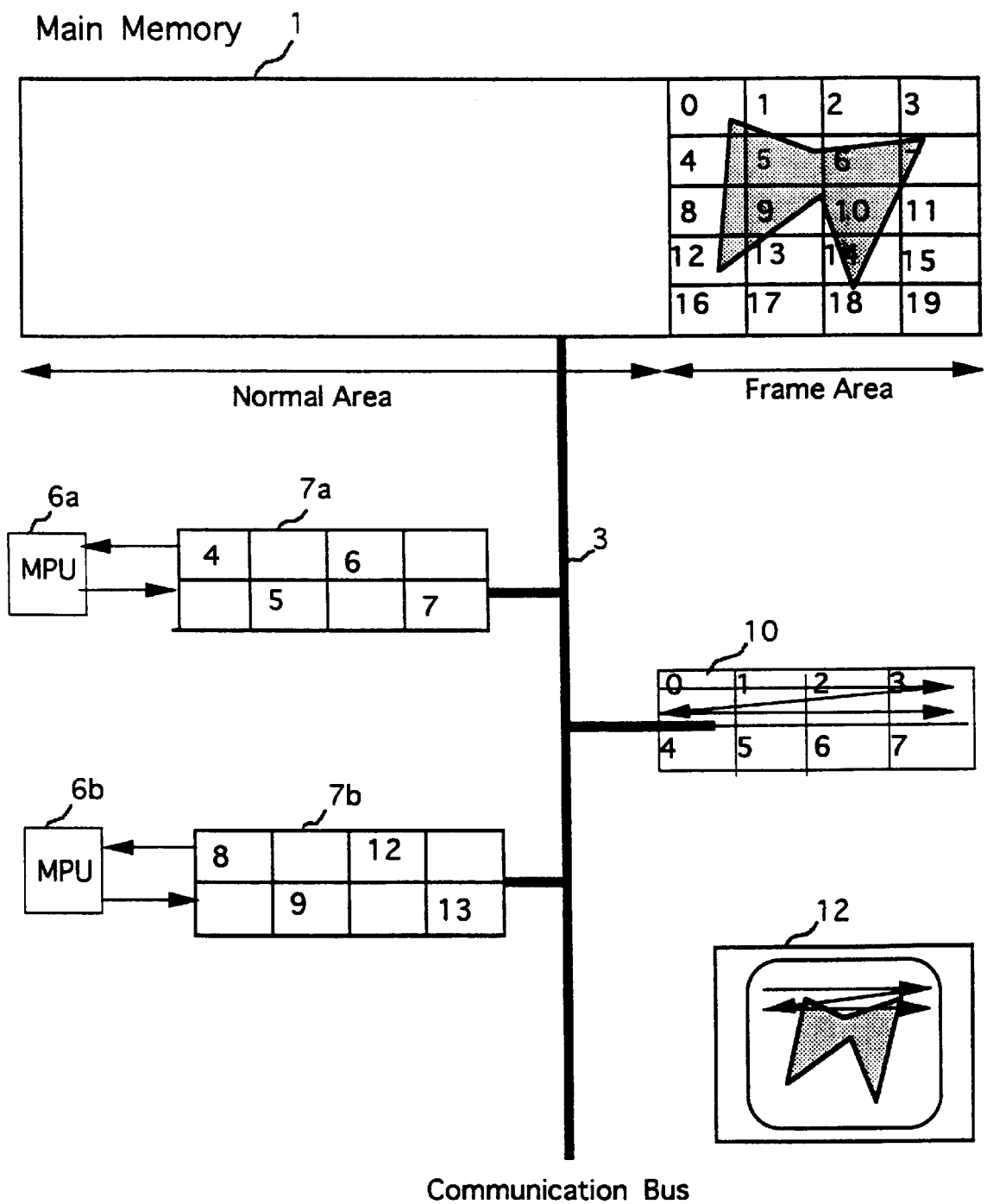
FIG. 2 is a schematic view for explaining the operation of a computer graphics apparatus according to the first embodiment of the present invention.

This invention will be described in further detail by way of example with reference to the accompanying drawings.
First Embodiment
FIG. 1 is a block diagram of a computer graphics apparatus practiced as a first embodiment of the invention. FIG. 2 is a schematic view for explaining how the first embodiment works. As shown in FIG. 1, the first embodiment comprises a main memory 1, a bridge 2 connected to the main memory 1, and a host bus 3 and a local bus 4 branched from the bridge 2.

The host bus 3 is connected to a plurality of processing elements 5a, . . . , 5b. Each of the processing elements 5a, . . . , 5b has a microprocessing unit (abbreviated to the MPU hereafter) 6a, . . . , 6b acting as a computing unit, a cache memory 7a, . . . , 7b, and a bus interface 8a, . . . , 8b. The bus interfaces 8a, . . . , 8b are connected to the host bus 3.

The host bus 3 is also connected to a graphics controller 9. In turn, the graphics controller 9 is connected to a video cache memory 10 and a RAMDAC 11. The RAMDAC 11 is coupled to a raster scan display 12. The local bus 4 is connected to various devices such as a local device 13.

The main memory 1 has a frame area for accommodating digital data illustratively representing the color intensities of pixels to be output to the display 12. More about this aspect of the invention will be described later with reference to FIG. 2. The bridge 2 permits data transmission among the main memory 1, host bus 3 and local bus 4.

In the processing elements 5a, . . . , 5b, the bus interfaces 8a, . . . , 8b provide data communication among the host bus 3, the MPUs 6a, . . . , 6b and the cache memories 7a, . . . , 7b. The MPUs 6a, . . . , 6b perform data processing including arithmetic operations in accordance with the programs stored in the main memory 1. The MPUs are illustratively the i486™ or the Pentium™ each from Intel.

The cache memories 7a, . . . , 7b retain partial copies of the programs and data stored in the main memory 1. From the viewpoint of the MPUs 6a, . . . , 6b, the cache memories 7a, . . . , 7b permit shorter access times than the main memory 1 and thus contribute to making MPU programs run faster.

The raster scan display 12 is a device that displays images. The pixel colors of the ordinary raster scan display are generally represented by the three primary colors of red, green and blue (RGB). The intensities of the colors are each expressed by an analog value such as a voltage. Since the color intensities are handled as digital data inside the computer, it is necessary to furnish a digital-to-analog converter for converting the digital data to the corresponding analog values.

The RAMDAC 11 incorporates a digital-to-analog converter as well as a digital value translation table implemented in a built-in SRAM. The graphics controller 9 supplies the RAMDAC 11 with the necessary digital data on red, green and blue. The video cache memory 10 retains a partial copy of the data in the frame area of the main memory 1.

The raster scan display 12 displays graphic forms and characters by scanning the screen with an electronic beam from top left to bottom right (see arrows on the display 12 and in the video cache memory 10 in FIG. 2). That is, the scanning sequence is known in advance. The graphics controller 9 copies to the video cache memory 10 the pixel data that are predictable from and necessary for the raster scan, and supplies the RAMDAC 11 with the necessary data.

FIG. 1 illustratively indicates peak rates of data transmission between the main memory 1 and the host bus 3 as well as peak rates of data transmission between the main memory 1 and the bridge 2. The local bus 4 is generally connected to many local devices 13. As such, the local bus 4 is physically longer, larger in load capacity, wider in bit count, and lower in operating speed than the host bus 3.

How the first embodiment works will now be described by referring mainly to FIG. 2 and additionally to FIG. 1. FIG. 2 shows typical contents of a normal area and a frame area in the main memory 1, of cache memories 7a, . . . , 7b, and of the video cache memory 10, all interconnected by the host bus 3 for data transmission therebetween. In the main memory 1, the normal area stores ordinary programs and data whereas the frame area accommodates the image data to be displayed on the raster scan display 12. With the first embodiment of the present invention, the computing function of the MPUs 6a, . . . , 6b is used to carry out image processing. For the MPUs to perform image processing, it is necessary to copy not only ordinary programs and data from the normal area to the cache memories 7a, . . . , 7b but also the data from the frame area to these memories.

The first embodiment adopts a multi-processor construction comprising the plurality of processing elements 5a, . . . , 5b. This means that the different processing elements 5a, . . . , 5b may perform their processing concurrently, effecting image processing of different parts in the frame area at the same time. Because the MPUs 6a, . . . , 6b of the processing elements 5a, . . . , 5b process those pixel data from the frame area which have been copied to the corresponding cache memories 7a, . . . , 7b, there occurs an inconsistency between the MPU-processed data and the data in the frame area of the main memory 1. If the two sets of data need to be kept consistent, it is necessary that the contents of the cache memories 7a, . . . , 7b changed by the MPUs 6a, . . . , 6b be transferred to the frame area in the main memory 1 upon such changes. The process is generally known as the write through method.

However, if the cache memory contents are transferred every time they are changed, there occur frequent data transfers between the bridge 2 and the main memory 1. Since the main memory 1 is usually composed of a DRAM, the wait time between data transfers is longer than that of the cache memories 7a, . . . , 7b even though the data transfer bandwidth is substantially wide. This leads to further congestion of data traffic around the main memory 1. Because the main memory 1 is accessed not only by the host bus 3 but also by local devices 13 connected to the local bus 4, the data congestion centering on the main memory 1 tends to reduce the performance of the system as a whole.

The scanning sequence of the raster scan display 12 is predetermined as mentioned above, and the screen is refreshed usually at about 2 to 80 Hz per second. This requires furnishing one frame of image data at intervals of about 2 ms or 6 ms. The first embodiment of the present invention takes this characteristic of raster scan into account and supplies the video cache memory 10 with the data necessary for raster scan when those data are needed. The data are then output from the video cache memory 10 to the display 12 via the RAMDAC 11.

The MPUs 6a, . . . , 6b compute the frame area data copied to the corresponding cache memories 7a, . . . , 7b. The data are not written through to the frame area in the main memory 1 every time they are computed. Instead, the computed data are treated in the so-called write-back mode. Specifically, whenever a different part of the frame area is copied to the cache memories 11, the data replaced in the cache memories are written back to the main memory 1 as needed.

In accordance with raster scan algorithms, the graphics controller 9 requests in advance necessary frame data from the main memory 1 as well as from the cache memories 7a, . . . , 7b of the processing elements 5a, . . . , 5b. In response, one of the main memory 1 and the cache memories 7a, . . . , 7b of the processing elements 5a, . . . , 5b, i.e., the one having the most recent data, transfers the data to the video cache memory 10 within a predetermined time.

Working as described above, the first embodiment of the present invention can prepare the necessary data in the video cache memory 10 within the predetermined time and output the data to the raster scan display 12 as needed. Under this scheme, there is no need to effect a data transfer to the main memory 1 every time any of the MPUs 6a, . . . , 6b has acted or the contents of the cache memories 7a, . . . , 7b are updated. Even when the pixel is updated a plurality of times, the transfer of the data is effected to the video cache memory 10 alone at a required point in time only. This alleviates the data congestion around the main memory 1 as well as the congestion of data traffic on the host bus 3, whereby higher system performance is ensured.

Even if the number of processing elements 5a, . . . , 5b is increased, the absence of write-through operations prevents the congestion on the host bus 3 from rising in proportion to the growing number of processing elements. Because the congestion on the host bus 3 is determined by the frequency of data transfers (to the video cache memory 10) necessary for display, there occurs little increase in the data congestion on the host bus 3. Thus a growing number of processing elements 5a, . . . , 5b improves the image processing capability of the embodiment in a substantially linear fashion. Whereas FIG. 1 shows a plurality of processing elements 5a, . . . , 5b furnished, at least one processing element need only be incorporated.

As described, the computer graphics apparatus practiced as the first embodiment of the invention has no specialized pixel buffer required in addition to the main memory 1. Instead, part of the main memory 1 is utilized as the frame area in which to map such data as the color intensities of pixels conventionally retained in a pixel buffer. The data thus mapped are copied to the cache memories 7a, . . . , 7b for processing by the MPUs 6a, . . . , 6b. This reduces the total memory usage required and provides improved system performance without resorting to more logic chips (e.g., of arithmetic circuits) or to an increase in their scale.

Second Embodiment

Figure 3:
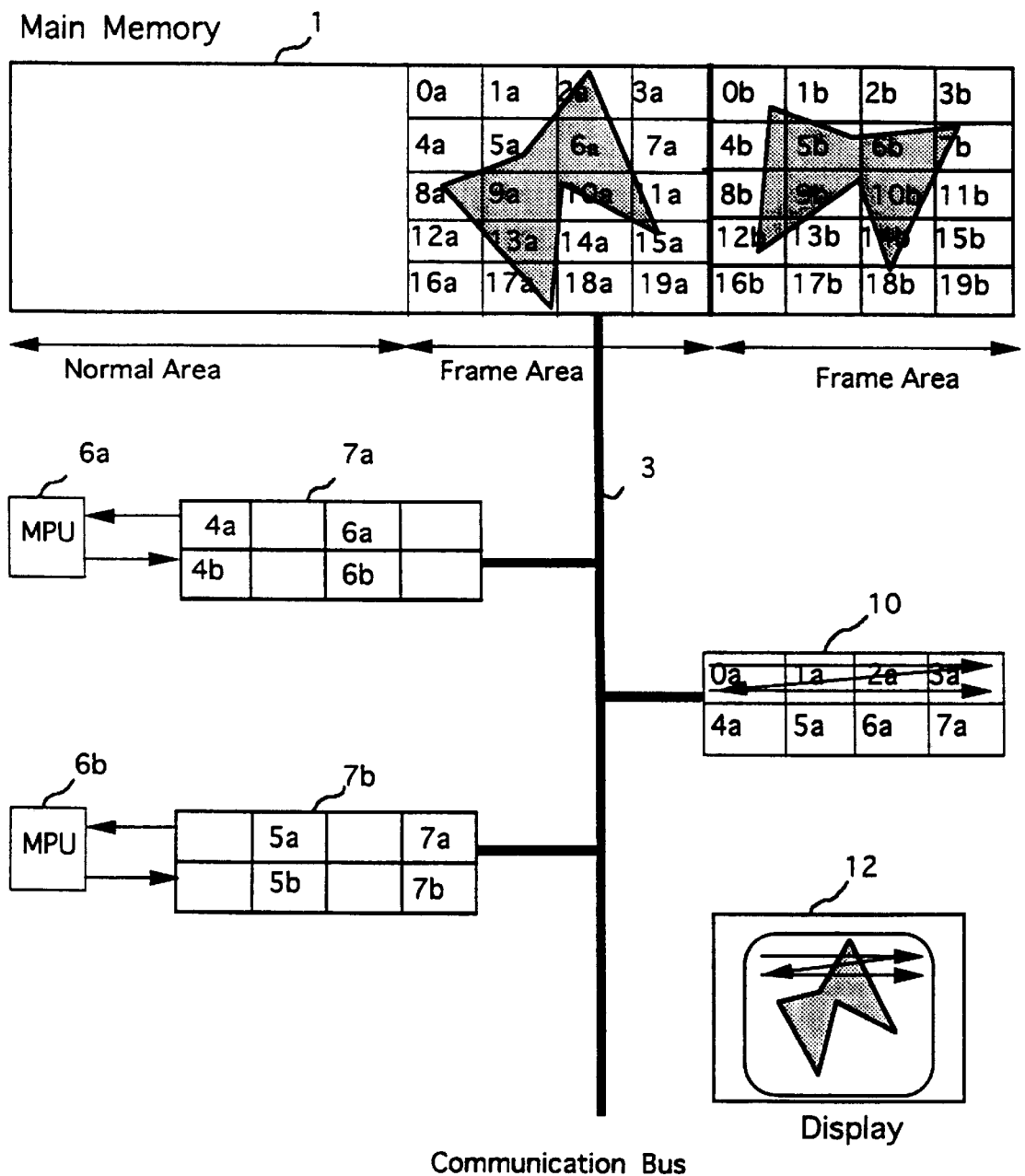
FIG. 3 is a schematic view for explaining the operation of a computer graphics apparatus according to a second embodiment of the present invention.

FIG. 3 is a schematic view for explaining a computer graphics apparatus practiced as a second embodiment of the invention. The second embodiment is identical in constitution to the first embodiment but implements so-called double buffering. FIG. 3 shows typical contents of the normal and frame areas in the main memory 1, of the cache memories 7a, . . . , 7b, and of the video cache memory 10.

FIG. 3 also illustrates typical interrelations between the main memory 1, the microprocessing units (MPUs) 6a, . . . , 6b and cache memories 7a, . . . , 7b in the processing elements 5a, . . . , 5b, and the video cache memory 10. In addition, FIG. 3 sketches how a display is effected on the raster scan display 12.

In the first embodiment of FIG. 1, a single frame area in the main memory 1 is used to reproduce a motion picture on the display 12. Because the motion picture is a graphic form that changes at a certain speed, the content of the frame area needs to be redrawn periodically. When the frame area containing the image currently displayed on the display 12 is redrawn for the motion picture, part of the frame area needs to be updated. It so happens that the content of the frame area being redrawn this way is displayed as it is on the display 12. This leaves room for improvement in making the motion picture move in a sufficiently smooth manner.

One solution to the above drawback is double buffering. Detailed algorithms for double buffering are introduced by Foley, van Dam, Feiner and Hughes in their above-cited book, "Computer Graphics: Principles and Practice" (from Addison-Wesley). Simply put, the algorithms involve allocating two frame areas A and B in the main memory 1 as shown in FIG. 3. In order to make the motion picture move more smoothly, the content of one frame area is drawn while the display 12 is displaying the content of the other frame area.

In operation, the content of the frame area A in FIG. 3 is transferred to the video cache memory 10 from the main memory 1 or from the cache memories 7a, . . . , 7b. At the same time, the content of the frame area B is copied to the cache memories 7a, . . . , 7b for image processing by the corresponding MPUs 6a, . . . , 6b. This arrangement makes the motion picture move in a sufficiently smooth fashion.

Third Embodiment

FIGS. 4(*a*) through 4(*d*) are schematic views for explaining the operation of a computer graphics apparatus practiced as a third embodiment of the present invention. Described below with reference to FIGS. 4(*a*) through 4(*d*), as well as to FIG. 1 where necessary, is a method whereby the graphics controller 9 requests necessary frame data in advance from the main memory 1 and from the cache memories 7a, . . . , 7b of the processing elements 5a, . . . , 5b in accordance with raster scan algorithms. This method may also be applied to the first embodiment.

In connection with the third embodiment, FIG. 4(*a*) shows typical memory contents of that frame area in the main memory 1 which corresponds to the display, and FIG. 4(*b*) indicates what the video cache memory 10 illustratively contains. More specifically, FIG. 4(*a*) gives an example in which one frame on the display is composed of 800 by 600 pixels. The frame area corresponding to the display is divided into 96 pixel groups (i.e., 8 by 12) as shown in FIG. 4(*a*). Each pixel group has a size of 100 by 50 pixels (i.e., 5,000 pixels). The pixel groups are numbered as illustrated. Each of the numbers is called an index.

As indicated in FIG. 4(*b*), the video cache memory 10 is made up of two memory portions: a tag memory 14 and a pixel memory 15. The pixel memory 15 accommodates data of some of the pixel groups in the frame area. In the example of FIG. 4(*b*), the pixel memory 15 comprises two sets 15a and 15b of eight pixel groups each. If each pixel is assumed to be represented by 12 bits or 3 bytes (1 byte for each of red, green and blue), then each pixel group requires 5,000 pixels and thus amounts to 15 kilobytes. In that case, the pixel memory 15 comprises 120 kilobytes (15 kilobyte×8 pixel groups×2 sets).

The tag memory 14, i.e., the other memory in the video cache memory 10, indicates which pixel group in the pixel memory 15 corresponds to which pixel group in the frame area. The tags constituting the tag memory 14 correspond to the pixel groups involved. The tag memory 14 retains information as to whether or not a given pixel group is valid. The tag memory 14 also has index values each indicating where a given pixel group, found to be valid, is located in the frame area. Because the maximum index value for pixel groups is 95 in this frame area example, each index value may be expressed in seven bits. Thus if the validity of pixel groups is indicated by one bit, each tag is expressed by a total of eight bits (1 byte), and the tag memory 14 is as small as 16 bytes (1 byte×8 tags×2 sets).

It is thus possible to have the pixel memory 15 in the video cache memory of FIG. 4(*b*) correspond to the video cache memory 10 of FIG. 1 and to incorporate the tag memory 15 in the graphics controller 9. In practice, the tag memory 15 is usually built in the graphics controller 9.

On the screen, raster scan proceeds horizontally from left to right. Past the rightmost position of each row, the scan moves to the leftmost position of the next row, and the process is repeated. Suppose now that the bottom left corner of the pixel group numbered 32 (i.e., index number) is being scanned. After that position, 100 pixels within the same pixel group 32 are scanned rightward, followed by the top left corner scanned next in the pixel group 33. The process is repeated so that the scan reaches the top right corner of the group 39. The scan then proceeds from the leftmost position to the right on the second row in the pixel group 32. To scan the pixel groups 32 through 39 requires scanning 40,000 pixels (100 pixels×50 pixels×8 groups). With the 40,000 pixels scanned in the pixel groups 32 through 39, the data ranging from the pixel group 40 to the pixel group 47 are needed next.

The video cache memory in FIG. 4(*b*) is divided into two major banks 'a' and 'b': bank 'a' comprising a tag memory 14a and a pixel memory 15a, and bank 'b' including a tag memory 14b and a pixel memory 15b. With the third embodiment, while one of the two banks 'a' and 'b' in the video cache memory 10 is being scanned, the next pixel groups to be required after that bank scan are loaded into the other bank. Illustratively, while the bank 'b' is being scanned, the pixel groups 40 through 47 to be needed next are loaded into the bank 'a'.

In the graphics controller 9, the position of raster scan is generally expressed by the format shown in FIG. 4(*d*). In this format, the high-order bits represent an index, the mediumorder bits indicate the row in the pixel group having the index in question, and the low-order bits express the column on that row. Thus from the index values and a division parameter regarding the pixel groups in one bank, it is possible to predict the pixel groups to be loaded (i.e., prefetched) into the other bank.

In the manner described and according to appropriate raster scan algorithms, it is possible to request in advance necessary frame data from the main memory 1 as well as from the cache memories 7a, . . . , 7b of the processing elements 5a, . . . , 5b.

The method above may be applied to the first embodiment of FIG. 1. In that case, one of the main memory 1 and the cache memories 7a, . . . , 7b of the processing elements 5a, . . . , 5b, i.e., the one having the most recent data, transfers the data to the video cache memory 10 within a predetermined time. This allows the first embodiment to prepare the necessary data in the video cache memory 10 within the predetermined time and to output the data to the raster scan display 12 as needed, whereby enhanced system performance is made available.

Fourth Embodiment

Figure 5:
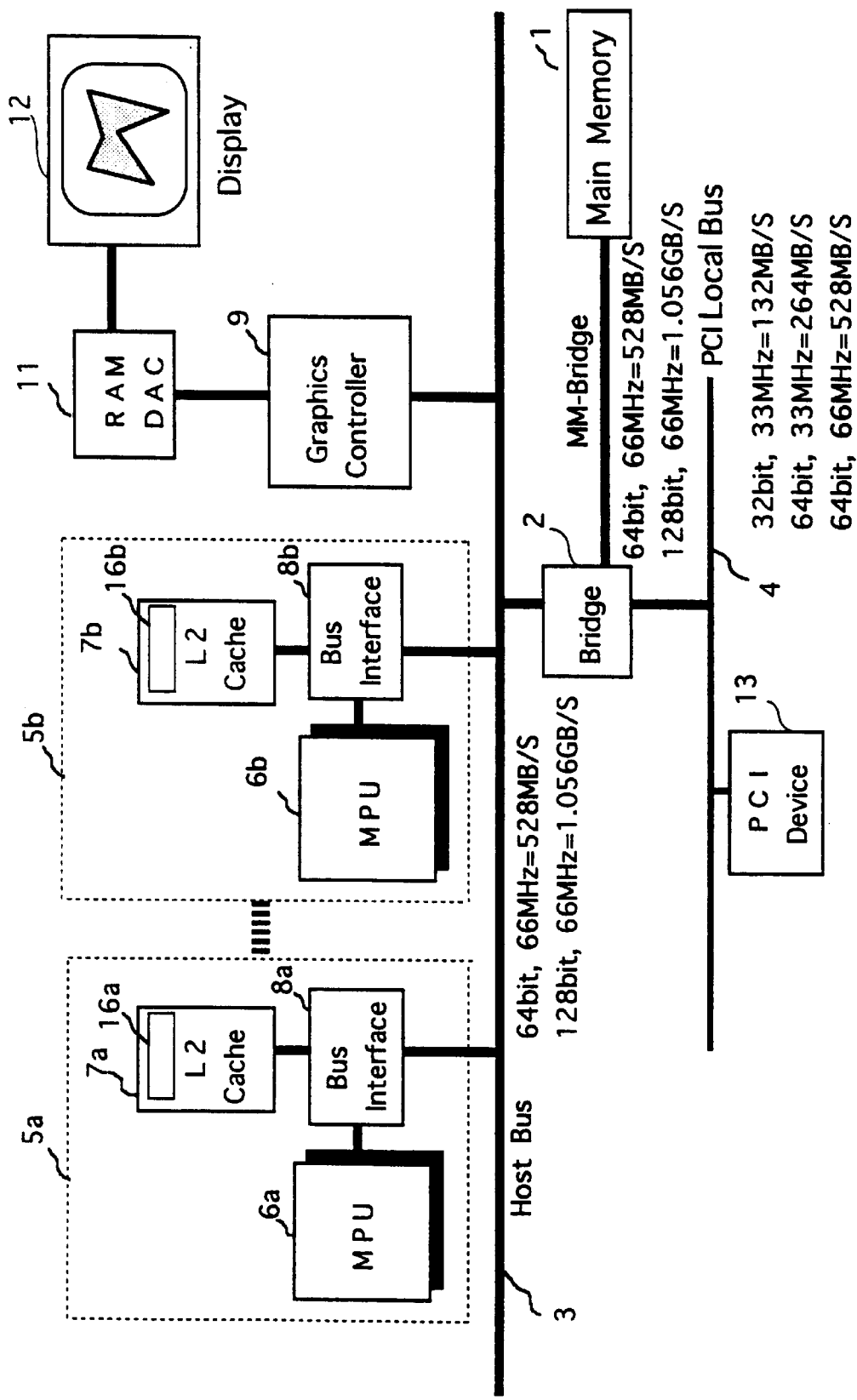
FIG. 5 is a block diagram of a computer graphics apparatus according to a fourth embodiment of the present invention.
Figure 6:
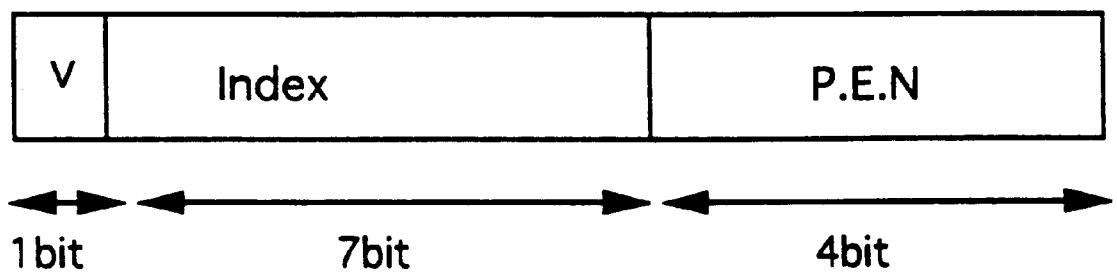
FIGS. 6 and 7 are schematic views for explaining the operation of a computer graphics apparatus according to the fourth embodiment of the present invention.
Figure 7:
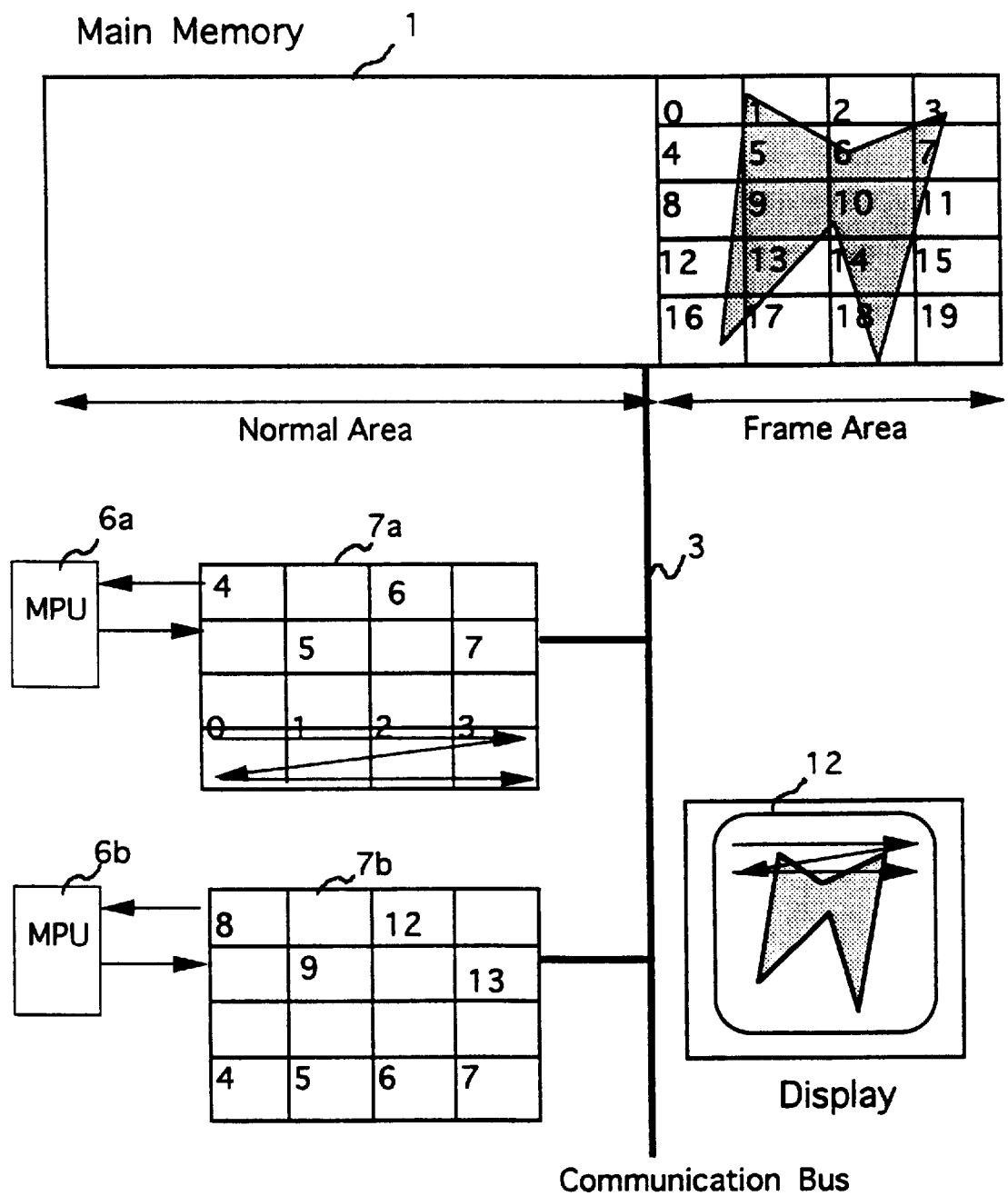

FIG. 5 is a block diagram of a computer graphics apparatus practiced as a fourth embodiment of the present invention. FIGS. 6 and 7 are schematic views for explaining how the fourth embodiment works.

As shown in FIG. 5, the fourth embodiment comprises a main memory 1, a bridge 2, a host bus 3 and a local bus 4. The host bus 3 is connected to a plurality of processing elements 5a, . . . , 5b. Each of the processing elements 5a, . . . , 5b has a microprocessing unit (MPU) 6a, . . . , 6b acting as a computing unit, a cache memory 7a, . . . , 7b, and a bus interface 8a, . . . , 8b.

The host bus 3 is also connected to a graphics controller 9 which in turn is connected to a raster scan display 12 via a RAMDAC 11. Unlike the first embodiment of FIG. 1, the fourth embodiment has no separately provided video cache memory 10. Instead, the cache memories 7a, . . . , 7b of the fourth embodiment incorporate video cache memory areas 16a, . . . , 16b. With the exception of the above structure, those parts of the fourth embodiment which also appeared with the same reference numerals in the first embodiment of FIG. 1 are exactly or substantially the same in function and operation. Such parts will not be described further in detail.

In the constitution of the first embodiment shown in FIG. 1, a sufficiently high transmission rate of the host bus 3 makes it unnecessary for the graphics controller 9 to be always equipped with the video cache memory 10. In such a case, as depicted in FIG. 5, the video cache memory 10 may be mapped in partially allocated areas 16a, . . . , 16b of the cache memories 7a, . . . , 7b in the processing elements 5a, . . . , 5b.

Figure 4A:
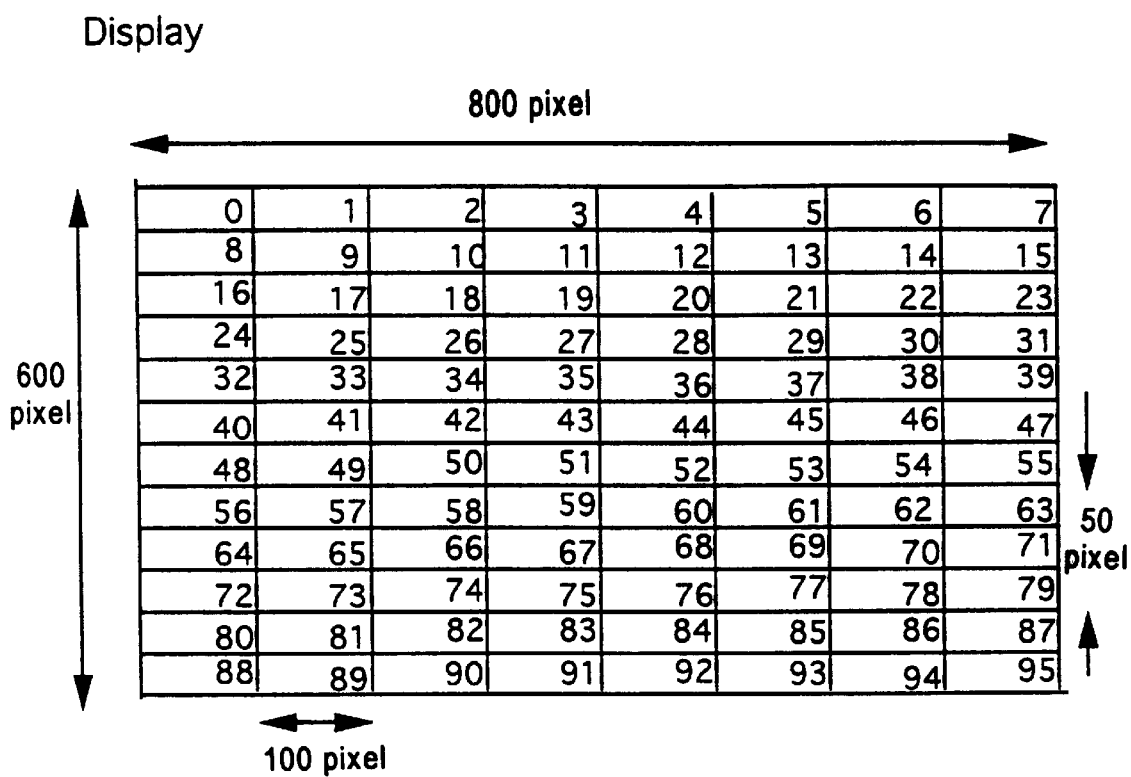
FIGS. 4(a) through 4(d) are schematic views for explaining the operation of a computer graphics apparatus according to a third embodiment of the present invention.
Figure 4B:
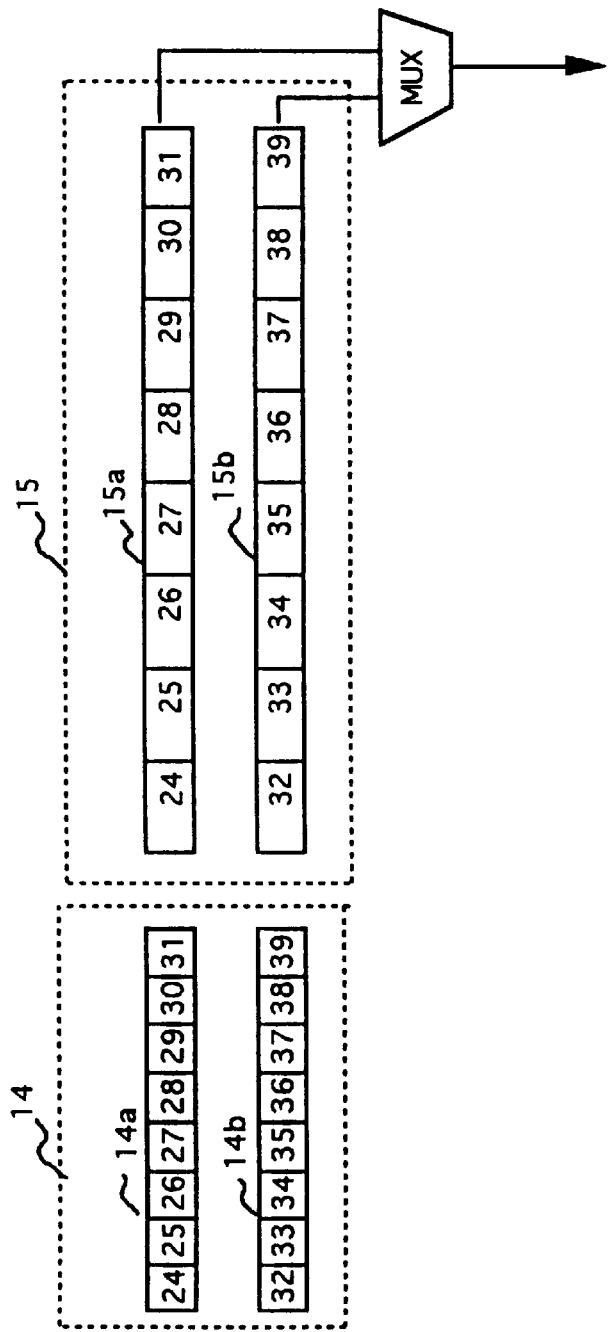
Figure 4D:
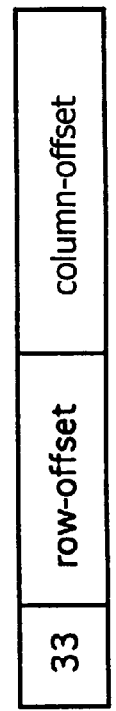
Figure 4C:
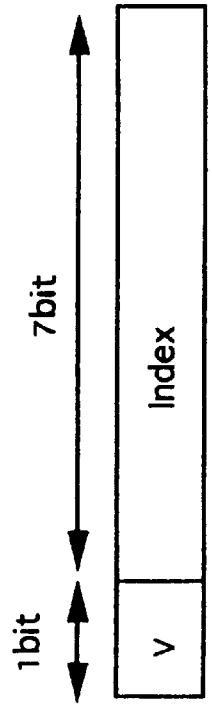

As discussed in connection with the third embodiment (FIG. 4(b)), the tag memory area in the video cache memory 10 is small in capacity. With the fourth embodiment, that small tag memory is incorporated in the graphics controller 9. The arrangement makes it possible to prefetch data from the cache memories 7a, . . . , 7b in the raster scan sequence.

If the tags in the tag memory 14 include information as to which cache memories 7a, . . . , 7b contain which pixel groups, then access is further facilitated. FIG. 6 shows a typical tag format of the tag memory 14 in the video cache memory where up to 16 processing elements 5a, . . . , 5b are each represented by four bits. This arrangement eliminates the need for the specialized video cache memory 10 such as the one in FIG. 1, which further reduces the cost of the system.

FIG. 7 is a schematic view for explaining the operation of the fourth embodiment. FIG. 7 illustrates interrelations between the contents of the frame area in the main memory 1, of the cache memories 7a, . . . , 7b in the processing elements 5a, . . . , 5b, and of a display on the raster scan display 12. What is shown in FIG. 7 is that raster scan is taking place in the pixel groups 0 through 3 held in the cache memory 7a. Whereas FIG. 5 indicates a plurality of processing elements 5a, . . . , 5b furnished, only one processing element need be incorporated.

As described, the computer graphics apparatus practiced as the fourth embodiment of the present invention has no specialized pixel buffer required in addition to the main memory 1. Instead, part of the main memory 1 is utilized as the frame area in which to map such data as the color intensities of pixels conventionally retained in a pixel buffer. Furthermore, the graphics controller 9 does not require the separately furnished video cache memory 10. Instead, part of the cache memories 7a, . . . , 7b is allocated as the video cache memory areas 16a, . . . , 16b in which to copy pixel data to be processed by the MPUs 6a, . . . , 6b. This arrangement reduces the total memory usage required and affords enhanced system performance without resorting to more logic chips (e.g., of arithmetic circuits) or to an increase in their scale. As another benefit, the cost of the system is lowered.

Fifth Embodiment

Figure 8:
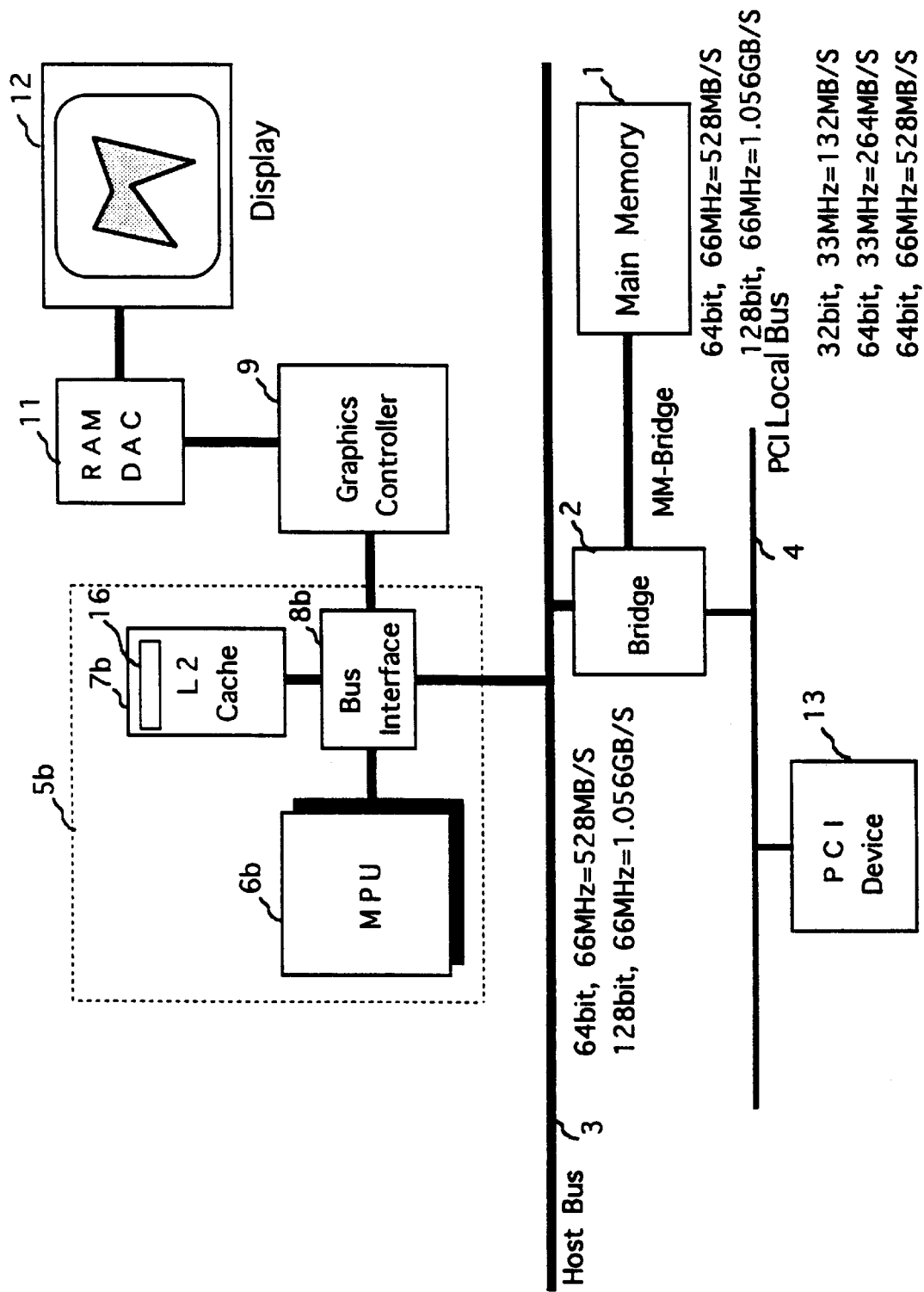
FIG. 8 is a block diagram of a computer graphics apparatus according to a fifth embodiment of the present invention.

FIG. 8 is a block diagram of a computer graphics apparatus practiced as a fifth embodiment of the invention. As shown in FIG. 8, the fifth embodiment comprises a main memory 1, a bridge 2, a host bus 3 and a local bus 4. The host bus 3 is connected to a processing element 5b which includes a microprocessing unit (MPU) 6b acting as a computing unit, a cache memory 7b and a bus interface 8b.

Unlike the first embodiment of FIG. 1, the fifth embodiment does not have the separately furnished video cache memory 10. Instead, part of the cache memory 7b is allocated as a video cache memory area 16b. In the fifth embodiment, the graphics controller 9 is connected directly to the bus interface 8b independently of the host bus 3. The graphics controller 9 is also connected to a raster scan display 12 via a RAMDAC 11. The local bus 4 is connected to various devices such as a local device 13. With the exception of the above structure, those parts of the fifth embodiment which also appeared with the same reference numerals in the first and the fourth embodiments of FIGS. 1 and 5 are exactly or substantially the same in function and operation. Such parts will not be described further in detail.

The fifth embodiment of the present invention allows the graphics controller 9 to transfer data directly to the cache memory 7b via the bus interface 8b of the processing element 5b without the intervention of the host bus 3. The host bus 3 is usually connected to a plurality of processing elements 5a, . . . , 5b as shown in FIG. 1. As such, the host bus 3 is physically long in wiring length and has a lower operating frequency than the data transfer section of the cache memory 7b. Thus connecting the graphics controller 9 directly to the bus interface 8b as shown in FIG. 8 boosts the rate of data transmission to the cache memory 7b. This provides a computer graphics apparatus higher in performance than the fourth embodiment of FIG. 5.

As described, the computer graphics apparatus practiced as the fifth embodiment of the present invention does not have a specialized pixel buffer in addition to the main memory 1. Instead, part of the main memory 1 is allocated as the frame area in which to map such data as the color intensities of pixels conventionally stored in a pixel buffer.

Furthermore, the graphics controller 9 does not use the separately furnished video cache memory 10. Instead, part of the cache memory 7b is allocated as the video cache memory area 16b in which to copy pixel data to be processed by the MPU 6a. Connecting the graphics controller 9 directly to the bus interface 8b further boosts the rate of data transmission to the cache memory 7b.

Constituted as described, the fifth embodiment reduces the total memory usage required and provides enhanced system performance without resorting to a growing number of logic chips or to an increase in their scale. Another benefit is that the cost of the system is lowered.

Sixth Embodiment

Figure 9:
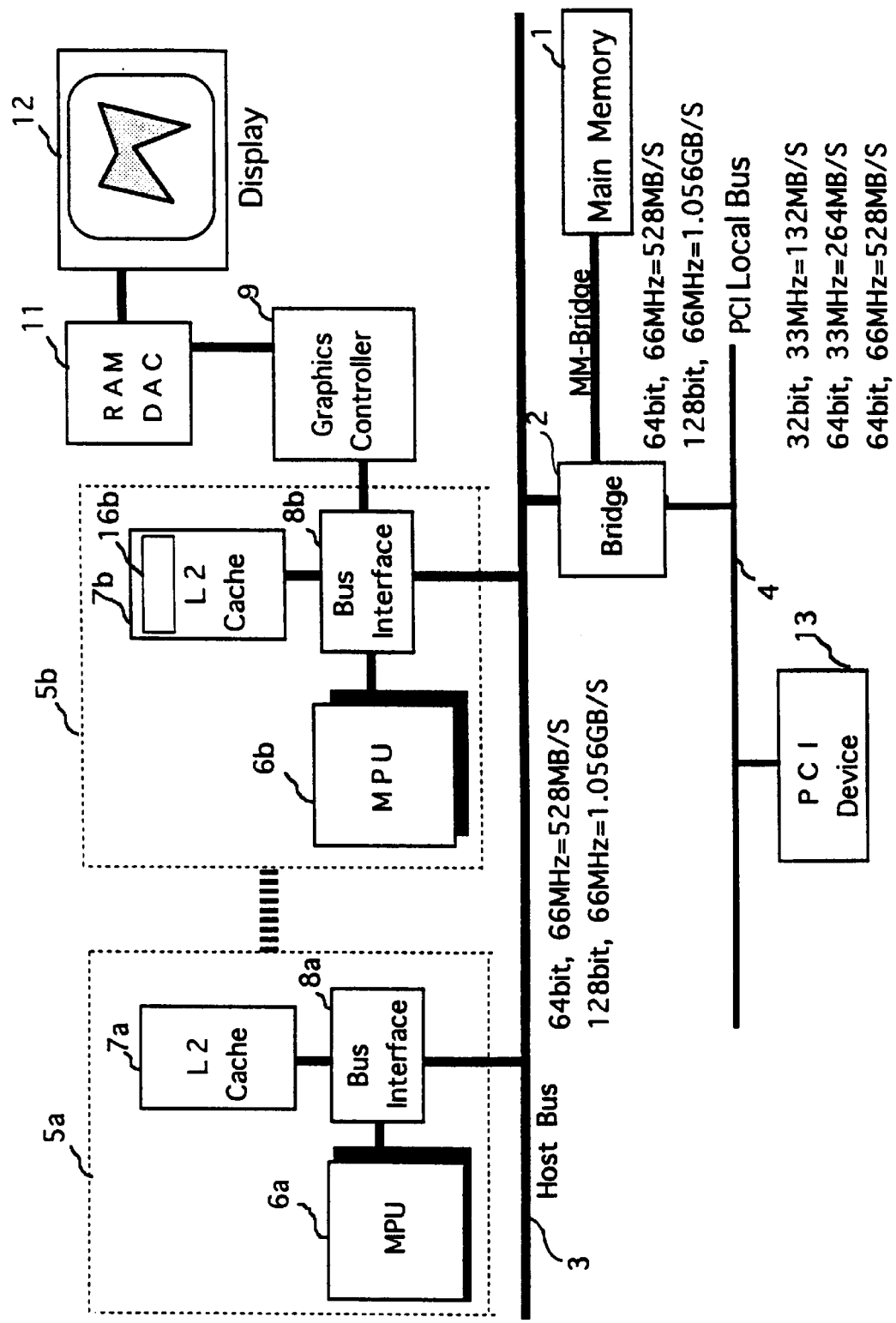
FIG. 9 is a block diagram of a computer graphics apparatus according to a sixth embodiment of the present invention.

FIG. 9 is a block diagram of a computer graphics apparatus practiced as a sixth embodiment of the present invention. The sixth embodiment utilizes the constitution of FIG. 8 for a multi-processor application.

As shown in FIG. 9, the sixth embodiment comprises a main memory 1, a bridge 2, a host bus 3 and a local bus 4. The host bus 3 is connected to a plurality of processing elements 5a, . . . , 5b. Each of the processing elements 5a, . . . , 5b has a microprocessing unit (MPU) 6a, . . . , 6b acting as a computing unit, a cache memory 7a, . . . , 7b and a bus interface 8a, . . . , 8b.

The sixth embodiment does not have the separately furnished video cache memory 10 of the first embodiment in FIG. 1. Instead, part of the cache memory 7b is allocated as a video cache memory area 16b. In addition, the sixth embodiment has the graphics controller 9 connected directly to the bus interface 8b. The graphics controller 9 is also connected to a raster scan display 12 via a RAMDAC 11. The local bus 4 is connected to various devices such as a local device 13. With the exception of the above structure, those parts of the sixth embodiment which also appeared with the same reference numerals in the first embodiment of FIG. 1 are exactly or substantially the same in function and operation. Such parts will not be described further in detail.

The sixth embodiment is characterized in that the graphics controller 9 transfers data directly to the video cache memory area 16b of the cache memory 7b through the bus interface 8b in the processing element 8b, without the intervention of the host bus 3. The host bus 3 is usually connected to a plurality of processing elements 5a, . . . , 5b as depicted in FIG. 9. As such, the host bus 3 is physically long in wiring length and has a lower operating frequency than the data transfer section of the cache memory 7b. Thus connecting the graphics controller 9 directly to the bus interface 8b as shown in FIG. 9 boosts the rate of data transmission to the cache memory 7b. This provides a computer graphics apparatus higher in performance than the fourth embodiment of FIG. 5.

The processing elements 5a, etc., not directly connected to the graphics controller 9, are arranged to execute tasks not relevant to image processing. In the case of image processing, the processed pixel data are transferred over the host bus 3 to the video cache memory area 16b in the cache memory 7b. Where the transmission rate of the RAMDAC 11 is high, a greater bandwidth is generally required for transmission of data from the video cache memory area 16b to the graphics controller 9 rather than for transmission of pixel data to the video cache memory area 16b. Thus the sixth embodiment provides a high performance system without the use of a specialized video cache attached conventionally to the graphics controller 9. Whereas FIG. 9 indicates a plurality of processing elements 5a, etc., not directly connected to the graphics controller 9, at least one such processing element need only be incorporated.

Seventh Embodiment

Figure 10:
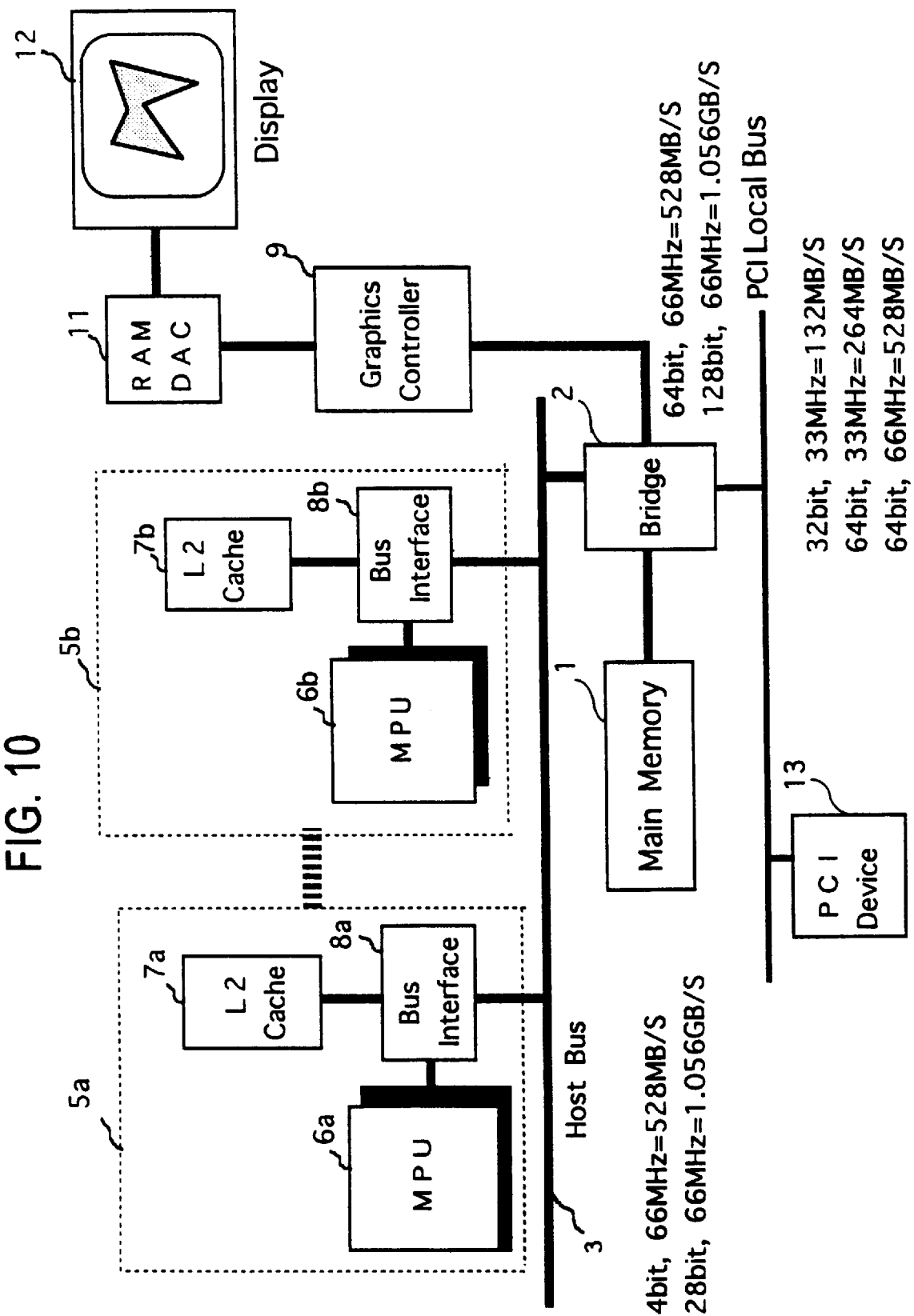
FIG. 10 is a block diagram of a computer graphics apparatus according to a seventh embodiment of the present invention.

FIG. 10 is a block diagram of a computer graphics apparatus practiced as a seventh embodiment of the present invention. As depicted in FIG. 10, the seventh embodiment comprises a main memory 1, a bridge 2 connected to the main memory 1, and a host bus 3 and a local bus 4 branched from the bridge 2.

The host bus 3 is connected to a plurality of processing elements 5a, . . . , 5b. Each of the processing elements 5a, . . . , 5b includes a microprocessing unit (MPU) 6a, . . . , 6b, a cache memory 7a, . . . , 7b, and a bus interface 8a, . . . , 8b. The bus interfaces 8a, . . . , 8b are connected to the host bus 3.

The bridge 2 is connected to a graphics controller 9 which in turn is connected to a RAMDAC 11. The RAMDAC 11 is coupled to a raster scan display 12. The local bus 4 is connected to various devices such as a local device 13. Those parts of the seventh embodiment which also appeared with the same reference numerals in the first embodiment of FIG. 1 are exactly or substantially the same in function and operation. Such parts will not be described further in detail.

The seventh embodiment does not have the separately furnished video cache memory 10 of the first embodiment in FIG. 1. Unlike the fourth embodiment in FIG. 5, the seventh embodiment has no video cache area allocated in the cache memories 7a, . . . , 7b. Instead, the seventh embodiment has its cache memories 7a, . . . , 7b double as a video cache memory.

As explained above in connection with FIG. 4(b), the tag memory area of the video cache memory has only a small capacity. Such a small-capacity tag memory is incorporated in the graphics controller 9 of the seventh embodiment. This makes it possible to prefetch data from the cache memories 7a, . . . , 7b in the raster scan sequence.

The access operation is further facilitated when, as discussed in connection with the fourth embodiment of FIG. 6, the tags in the tag memory have information as to which cache memories 7a, . . . , 7b contain which pixel groups.

As described, the computer graphics apparatus practiced as the seventh embodiment of the present invention has no specialized pixel buffer in addition to the main memory 1. Instead, part of the main memory 1 is allocated as the frame area in which to map such data as the color intensities of pixels held conventionally in a pixel buffer. The graphics controller 9 does not use a separately furnished video cache memory. Instead, pixel data are copied to the cache memories 7a, . . . , 7b for processing by the MPUs 6a, . . . , 6b.

The arrangement above reduces the total memory usage required and offers improved system performance without resorting to a growing number of logic chips or to an increase in their scale. Another benefit is that the cost of the system is lowered.

Although the graphics controller 9 in FIG. 10 is connected to the bridge 2, the controller may be connected alternatively to the host bus 3. In another alternative, the graphics controller 9 may be connected directly to the bus interface 8b independently of the host bus 3. Whereas FIG. 10 shows a plurality of processing elements 5a, . . . , 5b furnished; however, only one processing element need be incorporated.

Eighth Embodiment

Figure 11:
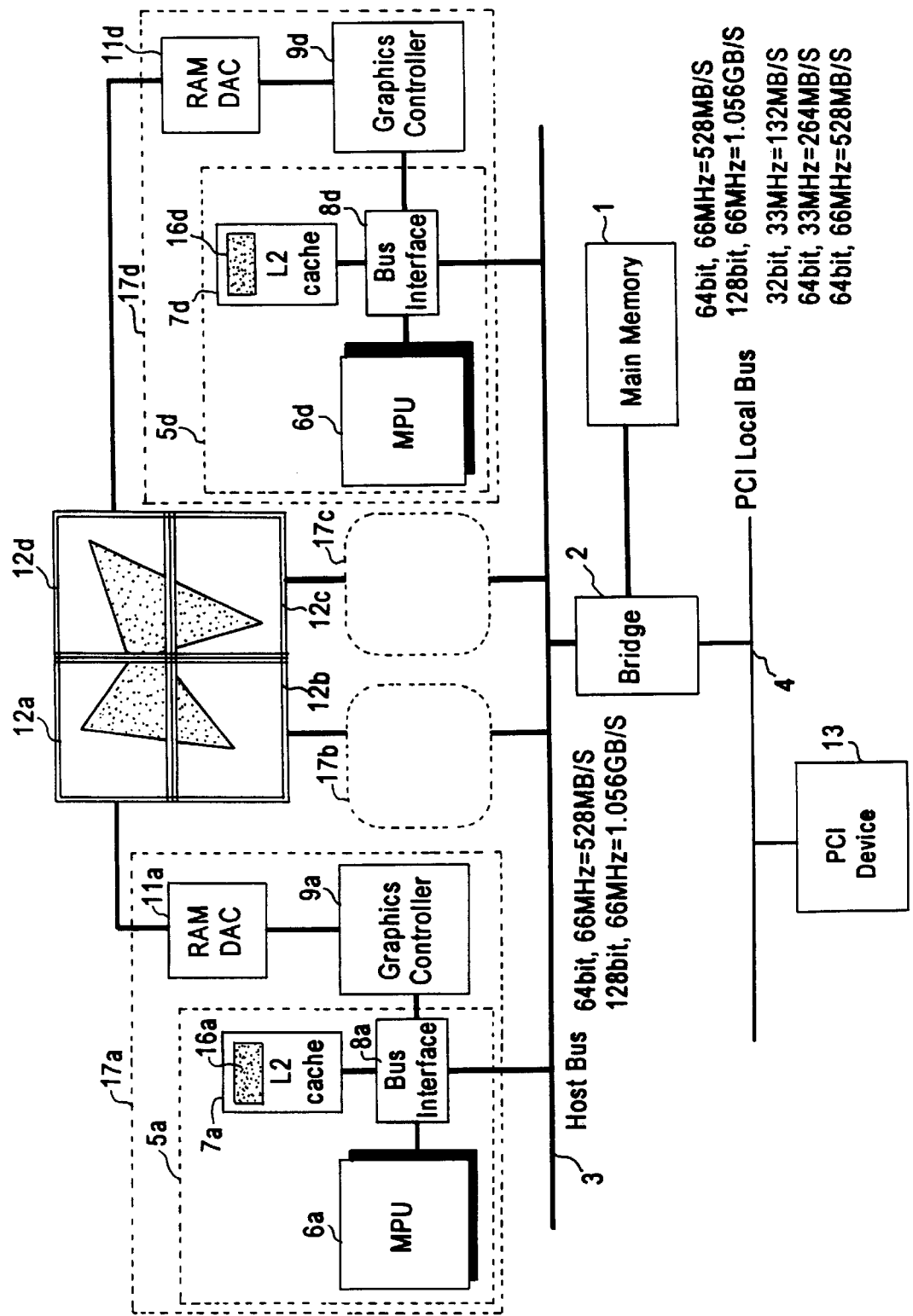
FIG. 11 is a block diagram of a computer graphics apparatus according to an eighth embodiment of the present invention.

FIG. 11 is a block diagram of a computer graphics apparatus practiced as an eighth embodiment of the invention. The constitution of FIG. 11 forms a system configuration involving a plurality of displays and is a structural extension of the fifth embodiment in FIG. 8.

As illustrated in FIG. 11, the eighth embodiment comprises a main memory 1, a bridge 2, a host bus 3 and a local bus 4. The host bus 3 is connected to a plurality of processing means 17a, 17b, 17c and 17d. Each of the processing means 17a, 17b, 17c and 17d has a processing unit 5a, ..., 5d, a graphics controller 9a, ..., 9d and a RAMDAC 11a, ..., 11d. The processing units 5a, ..., 5d each include a microprocessing unit (MPU) 6a, ..., 6d acting as a computing unit, a cache memory 7a, ..., 7d and a bus interface 8a, ..., 8d.

The apparatus also comprises raster scan displays 12a, 12b, 12c and 12d driven by the processing means 17a, ..., 17d, respectively.

In the eighth embodiment, the cache memories 7a, ..., 7d of the processing elements 5a, ..., 5d incorporate a video cache memory 16a, ..., 16d each. Furthermore, the eighth embodiment has the graphics controllers 9a, ..., 9d connected directly to the bus interfaces 8a, ..., 8d of the processing elements 5a, ..., 5d, respectively. Those parts of the eighth embodiment which also appeared with the same reference numerals in the first and the fifth embodiments of FIGS. 1 and 8 are exactly or substantially the same in function and operation. Such parts will not be described further in detail.

In operation, the eighth embodiment of the above constitution has the processing means 17a, ..., 17d operate in synchronism to process different display areas of a single screen independently of one another pursuant to a graphics program written for a single-screen application. This provides a multi-display large-screen image presentation. Although FIG. 11 indicates a multi-display enlarged screen example, modifying the graphics program allows each of the processing means 17a, ..., 17d to effect a graphic display independently. Whereas FIG. 11 shows four sets of the raster scan displays 12a, ..., 12d and processing elements 17a, ..., 17d connected, only at least two sets of these components need be provided.

The enlarged screen display device of the eighth embodiment is constructed by combining a plurality of units of the fifth embodiment's constitution in FIG. 7. Alternatively, such constitutional combination may be made of any of the other embodiments described above.

As described, the computer graphics apparatus according to the present invention does not have a specialized pixel buffer in addition to the main memory. Instead, part of the main memory is allocated as the frame area in which to map such data as the color intensities of pixels retained conventionally in a pixel buffer. Such data as the pixel color intensities stored in the main memory are copied to cache memories for processing by the corresponding MPUs. This scheme reduces the total memory usage required and provides enhanced system performance without resorting to more logic chips (e.g., of arithmetic circuits) or to an increase in their scale. The cost of the system is also held low according to the present invention.

In one variation, the computer graphics apparatus according to the present invention allocates part of the cache memories as video cache memory areas to which to copy such data as the color intensities of pixels from the main memory. The copied data in the video cache memory areas are processed by the corresponding MPUs. The arrangement reduces the total memory usage required and provides high system performance without resorting to more logic chips such as those of arithmetic circuits or to an increase in the scale of such chips. Furthermore, the cost of the system is lowered.

In another variation, the computer graphics apparatus according to the present invention allocates part of the cache memories as video cache memory areas to which to copy such data as the color intensities of pixels from the main memory. The copied data in the video cache memory areas are processed by the corresponding MPUs. In addition, the graphics controller is connected directly to the cache memories without the intervention of the host bus, whereby the rate of data transmission from the controller to the cache memories is enhanced. This arrangement reduces the total memory usage required and affords improved system performance without resorting to a growing number of logic chips or to an increase in their scale. The cost of the system is lowered at the same time.

In a further variation, the computer graphics apparatus according to the present invention allocates part of the main memory as a frame area in which to map such data as the color intensities of pixels that are retained conventionally in a pixel buffer. The mapped data are copied to cache memories for processing by MPUs. A dedicated video cache memory is connected directly to the graphics controller, intended to receive image information from both the main memory and the cache memories. This reduces the total memory usage required and provides enhanced system performance without resorting to more logic chips such as those of arithmetic circuits or to an increase in the scale of such chips.

In an even further variation, the computer graphics controller has frame areas allocated in the main memory for accommodating at least two frames of data therein. The arrangement allows the motion picture on display to move in a sufficiently smooth manner.

Obviously, numerous additional modifications and variations of the present invention are possible in light of the above teachings. It is therefore to be understood that within the scope of the appended claims, the present invention may be practiced otherwise than as specifically described herein.

What is claimed is:

1. A computer graphics apparatus comprising:
   a main memory for storing image data representing pixels on a raster scan display;
   a host bus, connected to said main memory via a bridge, for providing communication with said main memory through said bridge;
   a plurality of cache memory units each for retaining a respective partial copy of the image data in said main memory;
   a plurality of computing units for processing the image data copied into said cache memory units;
   a plurality of bus interface units, wherein each bus interface unit is connected to a corresponding one of said plurality of computing units, a corresponding one of said plurality of cache memory units, and said host bus, for providing communication between each computing unit and said bus and between each cache memory unit and said bus; and
   a graphics controller connected directly to at least one of said host bus and said bus interface unit, for acquiring image data by communicating with said main memory and at least one of said plurality of cache memory units using said at least one of said direct connections, said graphics controller further outputting the image data thus acquired to said raster scan display.

2. A computer graphics apparatus according to claim 1, wherein said host bus provides communication between said main memory and at least one of said plurality of computing units via said bridge and at least one of said plurality of bus interface units, said host bus further providing communication between said plurality of cache memory units and said graphics controller via said plurality of bus interface units.

3. A computer graphics apparatus according to claim 1, further comprising a data transmission bus acting independently of said host bus, said data transmission bus directly connecting said graphics controller and at least one of said plurality of bus interface units for data transmission between at least one of said plurality of cache memory units and said graphics controller.

4. A computer graphics apparatus according to claim 1, wherein said graphics controller is directly connected to said host bus for providing access to components to which the host bus is connected.

5. A computer graphics apparatus according to claim 1, wherein said graphics controller is directly connected to said bridge for improving access to the main memory by avoiding arbitration for the host bus.

6. A computer graphics apparatus according to claim 1, wherein at least one of said plurality of cache memory units comprises a video cache area for retaining said partial copy of the image data in said main memory.

7. A computer graphics apparatus according to claim 1, further comprising a video cache, directly connected to said graphics controller, for acquiring image data by communicating with said main memory and said cache memory units through said direct connection to said graphics controller.

8. A computer graphics apparatus according to claim 1, further comprising a video cache memory for acquiring image data by communicating with said main memory and said cache memory, wherein part of the image data to be accessed by said raster scan display is prefetched into said video cache memory prior to the access.

9. A computer graphics apparatus according to claim 8, wherein said video cache memory includes a pixel memory area for retaining a copy of image data and a tag memory area for accommodating the position of said image data on said raster scan display, and wherein said graphics controller predicts part of the image data required next on the basis of the content of said tag memory area and of the scanned position on said raster scan display.

10. A computer graphics apparatus according to claim 8, wherein said video cache memory includes a pixel memory area for retaining a copy of image data, wherein said graphics controller has a tag memory area for accommodating the position of said image data on said raster scan display, and wherein said graphics controller predicts part of the image data required next on the basis of the content of said tag memory area and of the scanned position on said raster scan display.

11. A computer graphics apparatus according to claim 1, wherein said main memory has a frame area for a plurality of frames, said frame area storing image data for display on said raster scan display.

12. A computer graphics apparatus according to claim 1, further comprising a write-back means for storing in said main memory, image data altered in said cache memory before overwriting said altered image data stored in said cache memory with new image data.

13. A computer graphics apparatus comprising:

a main memory for storing image data representing pixels on a raster scan display;

a host bus, connected to said main memory via a bridge, for providing communication with said main memory through said bridge;

a local bus, connected to said main memory via the bridge, for providing communication with said main memory through said bridge;

a cache memory unit for retaining a partial copy of the image data in said main memory;

a computing unit for processing the image data copied into said cache memory units;

a bus interface unit, wherein said bus interface unit is connected to said computing unit, said cache memory unit, and said host bus, for providing communication therebetween; and a graphics controller directly connected to said bridge for acquiring image data by communicating with said main memory only through said bridge, said graphics controller being free from connection to said local bus, and said graphics controller further outputting the image data thus acquired to said raster scan display.

14. A computer graphics apparatus comprising:

a main memory for storing image data representing pixels on a raster scan display;

a host bus, connected to said main memory via a bridge, for providing communication with said main memory through said bridge;

a cache memory unit for retaining a partial copy of the image data in said main memory;

a computing unit for processing the image data copied into said cache memory unit;

a bus interface unit connected to said computing unit, said cache memory unit, and said host bus, for providing communication between each computing unit and said bus and between each cache memory unit and said bus; and a graphics controller connected directly to at least one of said bus interface unit and said host bus, for acquiring image data by communicating with said main memory and said cache memory unit using said at least one of said direct connections, said graphics controller further outputting the image data thus acquired to said raster scan display.

* * * * *